(12) United States Patent
Cooper

(10) Patent No.: US 6,495,820 B1
(45) Date of Patent: Dec. 17, 2002

(54) SENSOR APPARATUS AND METHOD FOR SENSING ANGULAR ROTATION OF AN OBJECT USING LIGHT REFLECTED OFF A ROTOR AND BIFURCATION COMPENSATION

(75) Inventor: Stephen R. W. Cooper, Fowlerville, MI (US)

(73) Assignee: TRW Inc., Lyndhurst, OH (US)

( * ) Notice: Subject to any disclaimer, the term of this patent is extended or adjusted under 35 U.S.C. 154(b) by 115 days.

(21) Appl. No.: 09/678,366

(22) Filed: Oct. 2, 2000

(51) Int. Cl.⁷ ................................................. G01D 5/34
(52) U.S. Cl. ............................. 250/231.11; 200/61.52; 180/282
(58) Field of Search .................... 250/231.1, 231.11, 250/231.12, 231.14; 340/689, 686.3; 200/61.45, 61.46, 220, 61.52; 180/290, 282

(56) References Cited

U.S. PATENT DOCUMENTS

| | | |
|---|---|---|
| 4,207,463 A | 6/1980 | Iyeta |
| 4,247,769 A | 1/1981 | Warner |
| 4,320,293 A | 3/1982 | Guretzky |
| 4,338,517 A | 7/1982 | Perrine |
| 4,497,118 A | 2/1985 | Byrum |
| 4,554,450 A | 11/1985 | Goepel |
| 4,584,778 A | 4/1986 | Komasaku et al. |
| 4,587,513 A | 5/1986 | Burrowes et al. |
| 4,650,995 A | 3/1987 | Tokunaga et al. |
| 4,651,128 A | 3/1987 | Kolb |
| 4,664,519 A | 5/1987 | Hullein et al. |
| 4,683,375 A | 7/1987 | Hoshino et al. |
| 4,716,534 A | 12/1987 | Baucom et al. |
| 4,728,788 A | 3/1988 | Myers et al. |
| 4,798,087 A | 1/1989 | Takeda et al. |
| 4,922,620 A | 5/1990 | Terragni |
| 4,931,635 A | 6/1990 | Toyama |
| 5,103,090 A | 4/1992 | Weiner et al. |
| 5,120,706 A | 6/1992 | Weeks, II |
| 5,329,121 A | 7/1994 | Leviton |
| 5,392,112 A | 2/1995 | Nakamura |
| 5,483,050 A | 1/1996 | Fukasawa |
| 5,613,571 A | 3/1997 | Rank et al. |
| 5,670,780 A | 9/1997 | Lewis |
| 5,825,284 A | 10/1998 | Dunwoody et al. |
| 5,890,084 A * | 3/1999 | Halasz et al. ............... 180/282 |
| 6,091,533 A * | 7/2000 | Iizuka ........................ 359/205 |

* cited by examiner

Primary Examiner—Stephone B. Allen
Assistant Examiner—Bradford Hill
(74) Attorney, Agent, or Firm—Tarolli, Sundheim, Covell, Tummino & Szabo L.L.P.

(57) ABSTRACT

An apparatus (100) for sensing angular rotation includes a rotor (102) that is rotatable about an axis (104). The rotor (102) has an outer periphery (e.g., cylindrical outer sidewall 106) with a plurality of reflective facets (e.g., 108A–108J). Each juncture between each adjacent pair of the facets (e.g., 108A and 108B) defines a vertex (e.g., 125A). A light source (118) emits a light beam (120) onto the rotor (102). The light beam (120) is reflected by the facets (e.g., 108B) and occasionally bifurcated by the vertices (e.g., 125A). A light detector (126) detects light from the reflected light (124). The light detector (126) provides a detector signal (116) indicative of the angular rotation of the rotor (102). Compensation circuitry (134, 138) compensates for bifurcation of the reflected light (124) and provides a compensated output signal (140) indicative of angular rotation of the rotor (102).

22 Claims, 4 Drawing Sheets

SENSOR APPARATUS AND METHOD FOR SENSING ANGULAR ROTATION OF AN OBJECT USING LIGHT REFLECTED OFF A ROTOR AND BIFURCATION COMPENSATION

TECHNICAL FIELD

The present invention relates to sensing angular rotation of an object, and particularly relates to sensing angular rotation of an object for use in detecting a vehicle rollover condition.

BACKGROUND OF THE INVENTION

In order to detect an occurrence of a vehicle rollover it is known to equip a vehicle with a sensor for detecting the occurrence of a condition that is indicative of a vehicle rollover. The sensor, which typically includes one or more acceleration sensing devices, is connected to a controller. The sensor provides a signal that has a characteristic indicative of vehicle rollover to the controller. The controller, in turn, determines the occurrence of a vehicle rollover condition based on the sensor signal. The controller also may control actuation of one or more actuatable devices, such as an occupant restraint and/or an active suspension system, in response to determining the occurrence of a vehicle rollover condition. For example, U.S. Pat. No. 5,825,284 discloses a vehicle system having a sensor that provides a signal indicative of lateral acceleration of the vehicle. A processor is connected to the sensor for calculating a roll moment based on the sensor signal. The system includes a display device that visually displays an indication of the likelihood of a vehicle rollover condition based on the calculated roll moment.

Various devices also have been proposed for detecting angular orientation of an object. For example, U.S. Pat. Nos. 5,329,121, 4,207,463, 5,670,780, 5,103,090, and 4,320,293 disclose rotation angle measuring devices that sense rotation of a body using optical emitters and detectors.

SUMMARY OF THE INVENTION

In accordance with a one aspect, the present invention provides an apparatus for sensing angular rotation. The apparatus includes a rotor that is rotatable about an axis. The rotor has an outer periphery with a plurality of reflective facets. Each juncture between each adjacent pair of the facets defines a vertex. A light source emits a light beam onto the rotor. The light beam from the light source is reflected by the facets and occasionally bifurcated by the vertices. A light detector detects the reflected light and provides a detector signal indicative of angular rotation of the rotor and the bifurcation. Compensation circuitry, responsive to the detector signal, compensates for the bifurcation and provides a compensated output signal indicative of the angular rotation of the rotor.

In accordance with another aspect, the present invention provides a rollover sensor for a vehicle. The sensor includes a rotor that is rotatable about an axis and that has an outer periphery with a plurality of reflective facets. Each juncture between each adjacent pair of facets defines a vertex. A light source emits a light beam onto the rotor. The light beam from the light source is reflected by the facets and occasionally bifurcated by the vertices. A light detector detects the reflected light and provides a detector signal indicative of angular rotation of the rotor and the bifurcation. Compensation circuitry, responsive to the detector signal, compensates for the bifurcation and provides a compensated output signal indicative of angular rotation of the rotor. A controller determines an angular velocity of the vehicle based on at least one of the compensated output signal and the detector signal. The controller determines a vehicle rollover condition based on the determined angular velocity of the vehicle.

In accordance with still another aspect, the present invention provides an apparatus for sensing angular rotation. The apparatus includes rotor means for rotating about an axis. The rotor means has an outer periphery with a plurality of reflective members. Each juncture between each adjacent pair of the reflective members defines a vertex. Emitter means emits a beam onto the facets of the rotor means. The emitted beam is reflected by the facets and occasionally bifurcated by the vertices. Detector means detects the reflected beam and provides a detector signal indicative of angular rotation of the rotor means and the bifurcation. Compensation means, responsive to the detector signal, compensates for the bifurcation and provides a compensated output signal indicative of angular rotation of the rotor means.

In accordance with yet another aspect, the present invention provides a method for sensing angular rotation of an object. A rotor is mounted for rotation relative to the object that is in response to movement of the object. The rotor has an outer periphery with a plurality of reflective members. Each juncture between each adjacent pair of the reflective members defines a vertex. An emitted beam is emitted onto the rotor. The emitted beam is reflected by the reflective members and occasionally bifurcated by the vertices. The reflected light is detected and a detector signal that is indicative of angular rotation of the rotor and bifurcation is provided. The bifurcation is compensated and a compensated output signal indicative of angular rotation of the rotor is provided.

BRIEF DESCRIPTION OF THE DRAWINGS

The foregoing and other features and advantages of the invention will become more apparent to one skilled in the art upon consideration of the following description of the invention and the accompanying drawings, in which.

DESCRIPTION OF EXAMPLE EMBODIMENTS

Figures 1, 2:
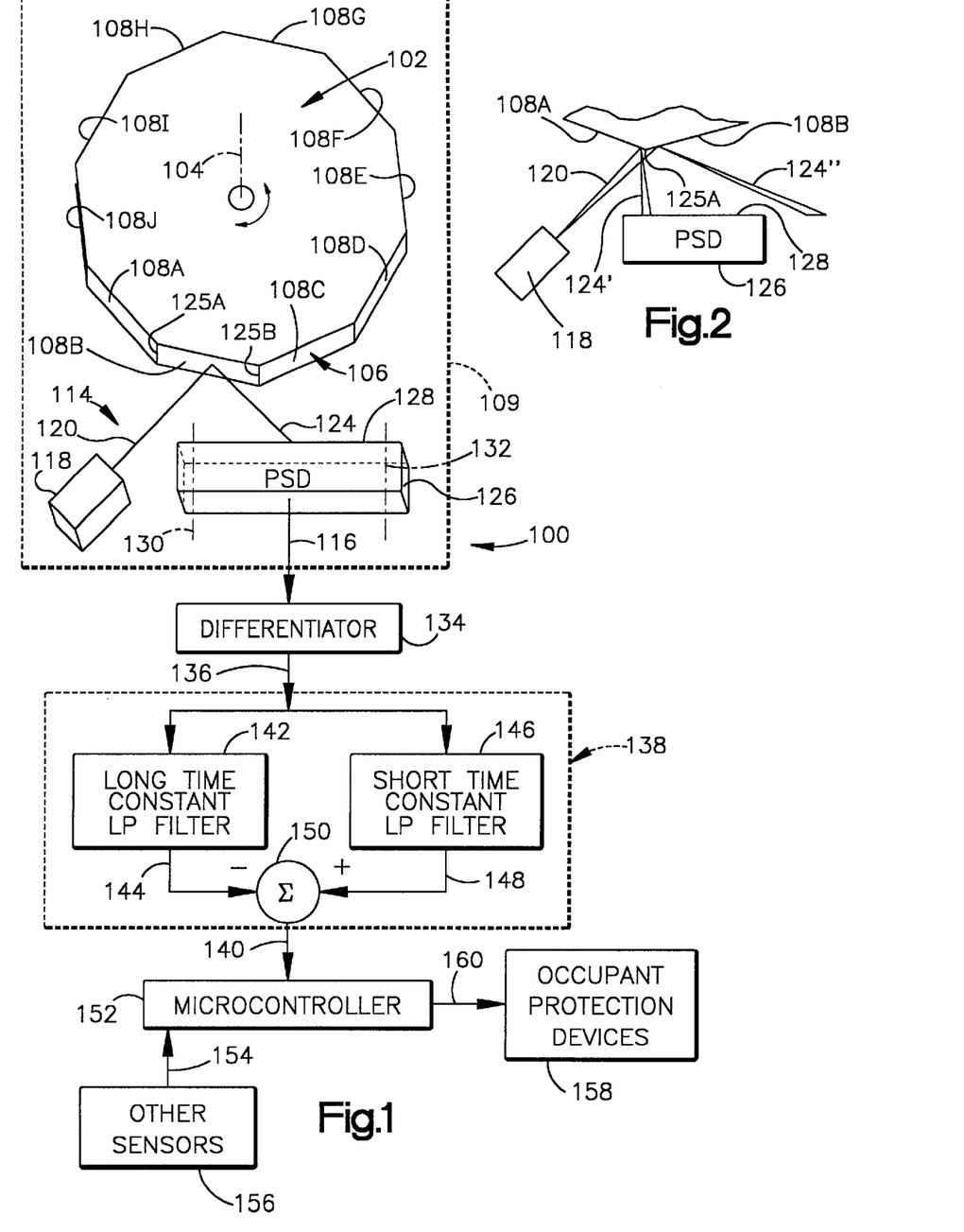
FIG. 1 is a schematic diagram of a vehicle rollover sensor apparatus in accordance with a first example embodiment of the present invention.
FIG. 2 is a view of part of the apparatus of FIG. 1 illustrating a bifurcation of light.

FIG. 1 illustrates a vehicle rollover sensor apparatus 100 in accordance with the present invention. The apparatus 100 includes a rotor 102 having a central rotor axis 104. The rotor 102 preferably is inertially balanced for substantially free rotation about its rotor axis 104. The rotor 102 has an outer periphery that is a generally cylindrical sidewall portion 106 with a plurality of facets (e.g., 108A–108J).

Each facet (e.g., 108C) extends to a juncture with each of two other facets (e.g., 108B and 108D). The juncture between each adjacent pair of facets (e.g., 108A and 108B) defines a vertex (e.g., 125A). Each of the facets 108A–108J is formed of a reflective material. In the embodiment shown in FIG. 1, the facets 108A–108J are each planar.

The rotor 102 is mounted for rotation within a housing (illustrated schematically at 109), and the rotor axis 104 extends in a fixed direction relative to the housing 109. Any suitable mounting arrangement, such as bearings (not shown), may be used to enable the rotor 102 to freely rotate about the rotor axis 104. In order to detect vehicle rollover, the housing 109 is mounted at a fixed location relative to the vehicle (not shown). For example, the housing 109 could be mounted at a central vehicle location with the rotor axis 104 extending parallel to a longitudinal (i.e., fore-to-aft) of the vehicle.

A rotation sensor 114, which is fixed relative to the housing 109, detects relative rotation between the rotor 102 and the housing. The sensor 114 provides a signal 116 that has a characteristic indicative of relative rotation between the rotor 102 and the housing 109.

In this example embodiment, the sensor 114 is positioned within the housing 109 adjacent the rotor 102. The sensor 114 includes a light source 118 (e.g., an LED or other optical emitter) that emits a substantially collimated beam of light 120. The light beam 120 strikes the sidewall portion 106 of the rotor 102 and is reflected as a light beam 124. The reflection typically occurs at an adjacent facet (e.g., 108B).

A light detector 126 (e.g., an optical receiver) receives the reflected light beam 124 and outputs the signal 116. In one preferred example, the light detector 126 is a position sensitive detector (PSD). Hereinafter, the light detector 126 is referred to as the PSD 126 and the signal 116 is referred to as the detector signal 116.

The PSD 126 has a light receiving surface 128 that includes, for example, an array of photodiodes. The array of photodiodes extends substantially linearly between longitudinally spaced ends of the PSD 126. The location of the photodiodes along the light receiving surface 128 defines an active region of the PSD 126. The active region extends, for example, between the dashed lines 130 and 132.

Upon reflection from a facet (e.g., 108B), the reflected light beam 124 produces a spot on the light receiving surface 128 of the PSD 126, which is detected by a one or more photodiodes thereof. The detector signal 116 output from the PSD 126 has an electrical characteristic indicative of the position at which the reflected light beam 124 strikes the light receiving surface 128, so long as the reflected light beam is within the active region (i.e., between lines 130 and 132). The sensitivity or resolution of the sensor 114 is related, at least in part, to the size of the spot of reflected light beam 124 and the number of photodiodes (e.g., pixels) that form the light receiving surface 128 of the PSD 126.

As the rotor 102 rotates about the axis 104 relative to the housing 109, the adjacent facet (e.g., 108B) moves. The rotation results in the reflected light beam 124 sweeping across the light receiving surface 128 commensurate with the amount of relative rotation between the rotor 102 and the housing 109. Accordingly, the electrical characteristic of the detector signal 116 changes in response to the sweep of the reflected light beam 124.

The detector signal 116 is provided to a differentiator circuit 134 that is configured to differentiate the detector signal 116 with respect to time. The differentiator circuit 134 may comprise analog and/or digital circuitry. If the differentiator circuit 134 is, for example, a digital circuit, a suitable analog-to-digital converter (not shown) is used to convert the analog detector signal 116 into a corresponding digital signal indicative of the position of the reflected light beam 124.

The differentiator circuit 134 provides a signal 136 that has a characteristic indicative of the rate of change of the detector signal 116. The rate of change is proportional to the rate of relative rotation (i.e., angular velocity) between the rotor 102 and the housing 109. As mentioned above, the housing 109 is fixed relative to the vehicle. Accordingly, the differentiated signal 136 also indicates a rate of roll of the vehicle.

When the light beam 120 strikes a vertex (e.g., 125A, FIG. 2), the light beam is bifurcated and is reflected as two separate light beams 124' and 124". It is to be appreciated that FIG. 2 illustrates the bifurcation condition with the thickness of. the light beam 120 shown as exaggerated and divergent to better illustrate the bifurcation. The signal characteristics in the differentiated signal 136, and thus the detector signal 116, corresponding to the bifurcation are compensated during processing.

In the illustrated embodiment of FIG. 2, the PSD 126 is positioned relative to the rotor 102 and relative to the light source 118 such that one of the beams (e.g., 124') strikes the active region of the PSD while the other beam (e.g., 124") that results from bifurcation does not strike the active region. Also, it is contemplated that, for a short time period, both of the two light beams 124' and 124" that result from bifurcation do not strike the active region of the PSD 126. Alternatively, the PSD 126 could be situated and configured such that one or both reflected beams that result from bifurcation always strikes the active region of the PSD 126. It is to be appreciated that the signal characteristics corresponding to the bifurcation are compensated during processing.

Also, the detector signal 116, and thus the differentiated signal 136, may include a portion that corresponds to initial relative rotation between the rotor 102 and the housing 109. Such initial relative rotation, for example, may be present at the onset of a vehicle rollover condition, such as due to vibration of the sensor 114 or friction in the mounting arrangement of the rotor 102 relative to the housing 109. Such initial relative rotation is also compensated during processing.

As part of the processing, the differentiated signal 136 is provided to a filter network 138. The filter network 138 is configured to smooth the signal 136, remove a portion of the signal due to initial relative rotation of the rotor 102 and to compensate for the occurrence of bifurcation. The filter network 138 may be implemented as hardware and/or software. The filter network 138 provides an output signal 140 that has a characteristic indicative of substantially instantaneous angular velocity of the rotor 102 relative to the housing 109. That is, the output signal 140 represents a dynamic rate of relative rotation between the rotor 102 and the housing 109. Accordingly, when the apparatus 100 is mounted in a vehicle, the output signal 140 indicates a substantially instantaneous rate of vehicle rotation characteristic of a vehicle rollover condition.

By way of example, the filter network 138 includes a long time constant or averaging filter 142, such as a low pass filter having a long time constant (e.g., having a corner frequency of about 0.01 Hz). The filter 142 passes a time-averaged, low frequency component of the differentiated signal 136. In particular, the filter 142 provides a signal 144 having a characteristic indicative of the rate of relative rotation between the rotor 102 and the housing 109 that has been averaged over time.

The differentiated signal 136 also is provided to another filter 146 connected in parallel with the filter 142. The filter 146, for example, is a low pass filter having a substantially shorter time constant than the filter 142 (e.g., having a corner frequency of about 100 Hz). The filter 146 filters the differentiated signal 136 to provide a signal 148 which is indicative of a more rapidly varying and substantially instantaneous relative rate of rotation between the rotor 102 and the housing 109. The signal 148 includes the dynamic portion of the differentiated signal 136 that is indicative of a vehicle rollover condition. The signal also includes a more static portion indicative of an initial rate of rotation between the rotor 102 and the housing 109.

A summer 150, which may be implemented as hardware and/or software, subtracts the time-averaged rotation rate signal 144 from the more rapidly varying rotation rate signal 148 to provide the output signal 140. The signal 140 has a characteristic indicative of the instantaneous rate of rotation of the rotor 102 which, when the apparatus 100 is mounted in a vehicle, is indicative of a vehicle rollover condition. The filter network 138, thus, reduces or removes the effects of initial relative rotation of the rotor, such as might occur due to vibration of the housing 109 and/or friction between the rotor and the housing. The low-pass filtering by the filter network 138 also adds stability to the differentiated signal 136. The stabilization of the differentiated signal 136 further helps compensate for the effects of bifurcation of the reflected light into the two light beams 124' and 124".

The output signal 140 is provided to a microcontroller 152, which is configured for determining whether a vehicle rollover condition exists. The microcontroller 152 may, for example, be formed of a microcomputer, a plurality of discrete components, one or more integrated circuits, and/or an application specific integrated circuit (ASIC). In a microcomputer embodiment of the present invention, the filter network 138 and/or differentiator circuit 134 also could be implemented as appropriate software stored in the microcomputer.

The microcontroller 152 also receives one or more signals 154 from one or more other associated sensors 156. Such other sensors 156 may include, for example, an acceleration sensing device (e.g., an accelerometer), an impact sensing device, a vehicle roll switch sensing device, and/or another crash sensing device. Such other sensors 156 provide signals useful in determining the occurrence of a vehicle crash event, such as vehicle rollover, or controlling actuation of one or more associated occupant protection devices 158.

The occupant protection devices 158 help prevent a vehicle rollover from occurring or help protect a vehicle occupant during a vehicle rollover. By way of example, the occupant protection devices 158 may include a seat belt pretensioning device, an actuatable vehicle roll bar, an actuatable head restraint, an active vehicle suspension system, an inflatable air curtain, and/or any other actuatable protection device. The microcontroller 152 also might determine, based on the output signal 140 and the signals 154, which actuatable occupant protection devices 158 should be actuated as well as their sequence of actuation.

The microcontroller 152 processes the output signal 140 and the signals 154 to determine whether a vehicle crash event exists, including a vehicle rollover. In the example of FIG. 1, the microcontroller 152 determines the occurrence of a vehicle rollover condition when the output signal 140 indicates an instantaneous rotation rate that exceeds a predetermined threshold value. The threshold value, which may be a fixed or variable, is determined from empirical testing for a particular vehicle platform. Upon determining the occurrence of a vehicle crash event, the microcontroller 152 provides an output control signal 160 to the occupant protection devices 158. The control signal 160 controls actuation of the occupant protection devices 158.

FIGS. 3A–3D illustrate movement of the reflected beam 124 relative to the light receiving surface 128 of the PSD 126 in the apparatus 100 of FIG. 1. In this example, the reflected light beam 124 is moving in the direction of arrow 162 in response to rotation of the rotor 102 (FIG. 1) relative to the PSD 126. In particular, in FIG. 3A the light beam 124 is reflected from an adjacent facet and strikes the PSD 126 near the center of its light receiving surface 128.

Figures 3A, 3B:
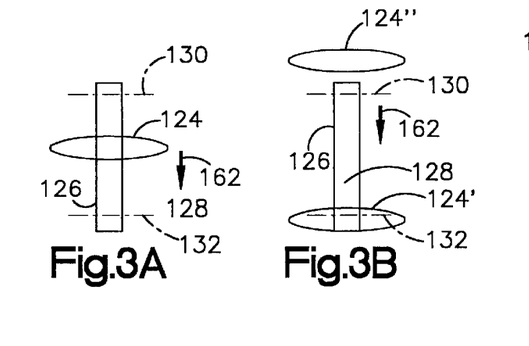
FIGS. 3a–3d are a series of views that illustrate movement of a reflected light beam relative to a light detector in the apparatus of FIG. 1.

FIG. 3B illustrates when the light beam 120 (FIG. 2) strikes a vertex (e.g., 125A) and is bifurcated into separate reflected portions, indicated at 124' and 124". For the position associated with FIG. 3B, only the lower reflected beam 124' strikes the light receiving surface 128 of the PSD 126. In the example embodiment, the position of the PSD 126 relative to the light source 118 and rotor 102 and the length of the light receiving surface of the PSD are selected such that only one part of the reflected light beam 124 strikes the light receiving surface during bifurcation.

Figures 3C, 3D:
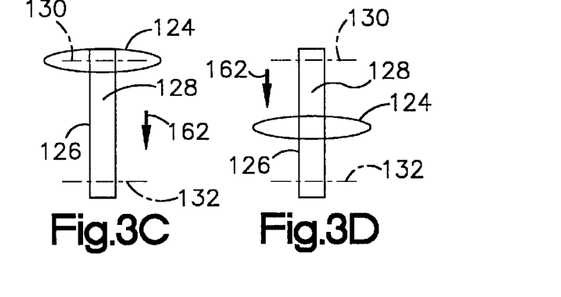

By the time the lower reflected beam 124' fades out (e.g., as the vertex rotates beyond the light beam 120), the upper reflected beam 124" strikes the light receiving surface 128 of the PSD 126, as shown in FIG. 3C. The reflected beam is again designated 124 and is the sole beam to impinge upon the light receiving surface 128 in FIG. 3C. As mentioned above, there may be a short time period when a reflected light beam does not strike the active region of the PSD 126. FIG. 3D illustrates the continued movement of the reflected light beam 124 in the direction of the arrow 162.

FIGS. 4A–4D illustrate an alternative sensor arrangement for the rotation sensor 114 of FIG. 1 in which identical reference numbers refer to corresponding parts previously identified in FIG. 1. This sensor arrangement includes two light sources (not shown, e.g., each an LED) that provide separate light beams. Alternatively, the two light beams could be provided from a single light source.

The two light sources are operated mutually exclusively so that only one light beam is provided onto the rotor at a given time. The two light sources are oriented (e.g., angled) so a light beam from one source impinges near a center of a facet, and, if the other source was simultaneously activated, a light beam from the other source would impinge at an adjacent vertex (i.e., a bifurcation would occur).

The alternative sensor arrangement for the rotation sensor 114 includes a photodiode 164 in combination with the PSD 126 of FIG. 1. The photodiode 164 (FIG. 4A) provides a signal used to select which of the two light sources is to provide a light beam onto the reflective rotor. In particular, the photodiode 164 is positioned adjacent to an end 166 of the PSD 126, such that it is able to detect reflected light 124 impinging upon the PSD at the end. The PSD 126 preferably is configured and positioned so as to only receive one reflected light beam at a given time (e.g., both beams that result from a bifurcation would not impinge upon the active region of the PSD).

Figures 4A, 4B:
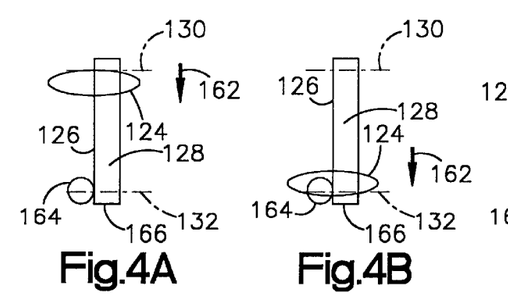
FIGS. 4a–4d are a series of views that illustrate movement of a reflected light beam relative to a light detector in an apparatus in accordance with a second example embodiment of the present invention.
Figures 4C, 4D:
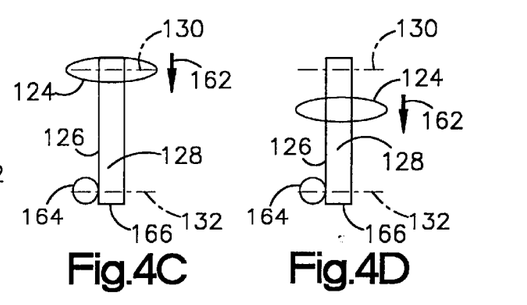

Referring to FIG. 4A, light from an active light source is reflected as beam 124 onto the active region of the PSD 126. As the rotor rotates, the reflected light beam 124 moves in the direction of the arrow 162 toward the end 166 of the PSD 126. The reflected light beam 124 striking the photodiode 164 (FIG. 4B) indicates that the reflected light beam 124 is at or approaching the limit of the active region of the light receiving surface 128.

When the reflected light beam 124 strikes the photodiode 164, the first (active) light source is switched OFF and the second light source is switched ON. Accordingly, the reflected light beam 124 (FIG. 4C) is light that originates from the second light source. The second light source then remains activated until the photodiode 164 detects the reflected light beam 124. At this point, the first light source is switched back ON and the second light source is switched OFF.

Instead of using the photodiode 164 for switching between the pair of light sources, the detector signal 116 from the PSD 126 itself could be monitored by a controller (e.g., 152 of FIG. 1) and used to control such switching. That is, when the detector signal 116 from the PSD 126 indicates that a reflected beam 124 is approaching an inactive end portion thereof, the active light source would be turned OFF and the other light source toggled ON. In this way, a reflected light beam is maintained within the active region of the PSD 126 and bifurcation may be avoided altogether.

Fluctuation of the detector signal 116 may occur each time the light sources are toggled ON/OFF. The fluctuation may result from different intensities of the light sources and because the arrangement only uses a single PSD 126. The filter network 138, as shown and described with respect to FIG. 1, helps reduce the effects of such switching between light sources.

Another alternative sensor arrangement for the apparatus of FIG. 1 is illustrated in FIGS. 5A–5D, in which identical reference numbers refer to corresponding parts previously identified. In this arrangement, a single light source (e.g., an LED) is used in combination with first and second PSDs 126' and 126", which collectively detect the reflected light beam 124. Each PSD 126', 126" has a respective light receiving surface 128', 128" and outputs a detector signal 116' and 116", as described above. The second PSD 126" is positioned adjacent to and offset longitudinally from the first PSD 126', as shown in FIGS. 5A–5D.

Figure 5A:
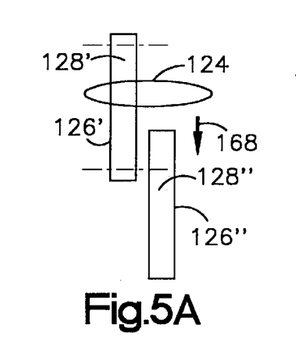
FIGS. 5a–5d are a series of views that illustrate movement of a reflected light beam relative to a pair of light detectors in an apparatus in accordance with a third example embodiment of the present invention.
Figure 5B:
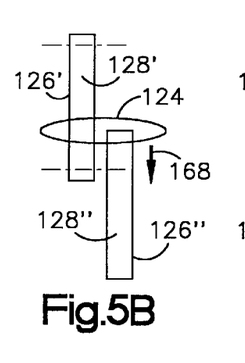

In FIG. 5A, the reflected light beam 124 strikes the center of the light receiving surface 128'. By way of example, the light beam 124 moves in the direction of the arrow 168 in response to rotation of the rotor 102 (FIG. 1). As the reflected light beam 124 (FIG. 5A) moves along the first PSD 126' in the direction of arrow 168, it eventually strikes the light receiving surface 128" of the second PSD 126", as shown in FIG. 5B.

Figure 5C:
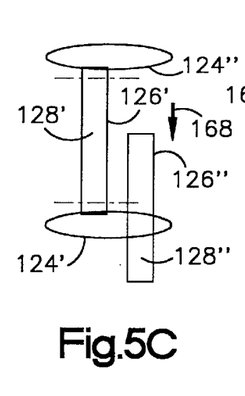

As the rotor-rotates to a position in which the light beam 120 (FIG. 2) from the light source 118 strikes a vertex (e.g., 125A), the light beam bifurcates, as illustrated in FIG. 5C. Specifically, the first beam 124' resulting from the bifurcation impinges on the active region of the light receiving surface 128" of the second PSD 126", and the beam 124" resulting from the bifurcation impinges at a location near a top end of the first PSD 126'. Appropriate control means are associated with each of the PSDs 126' and 126" to determine when such a bifurcation condition exists based on monitoring their respective detector signals 116' and 116".

When the second, lower PSD 126" begins to intercept the lower reflected beam 124', the detector signal 116" from the second PSD 126" is provided to appropriate signal processing circuitry, such as the filter network 138 (FIG. 1). At the same time, the detector signal from the first, top PSD 126' is switched out of such processing circuitry or ignored. After the reflected beam 124 strikes the active region of the first PSD 126' (FIG. 5D), the detector signal from the first PSD 126' is switched back in and the signal from the second PSD 126" is switched out. Preferably, the first PSD 126' has a length and is positioned so that only one reflected part of the beam strikes its light receiving surface 128' during bifurcation.

Figure 5D:
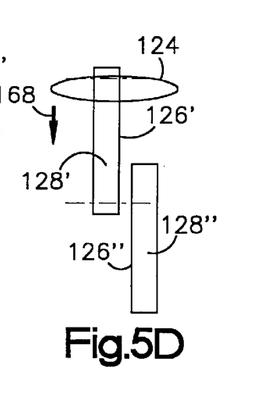

The signal from the second PSD 126" is used to compensate for the occurrence of a bifurcation condition by providing a detector signal indicative of the angular rotation when the first PSD 126' is unable to accurately do so, i.e., due to bifurcation of the light. Signal characteristics due to switching between PSDs during bifurcation are further reduced through the filtering techniques described above with respect to FIG. 1.

Figure 6:
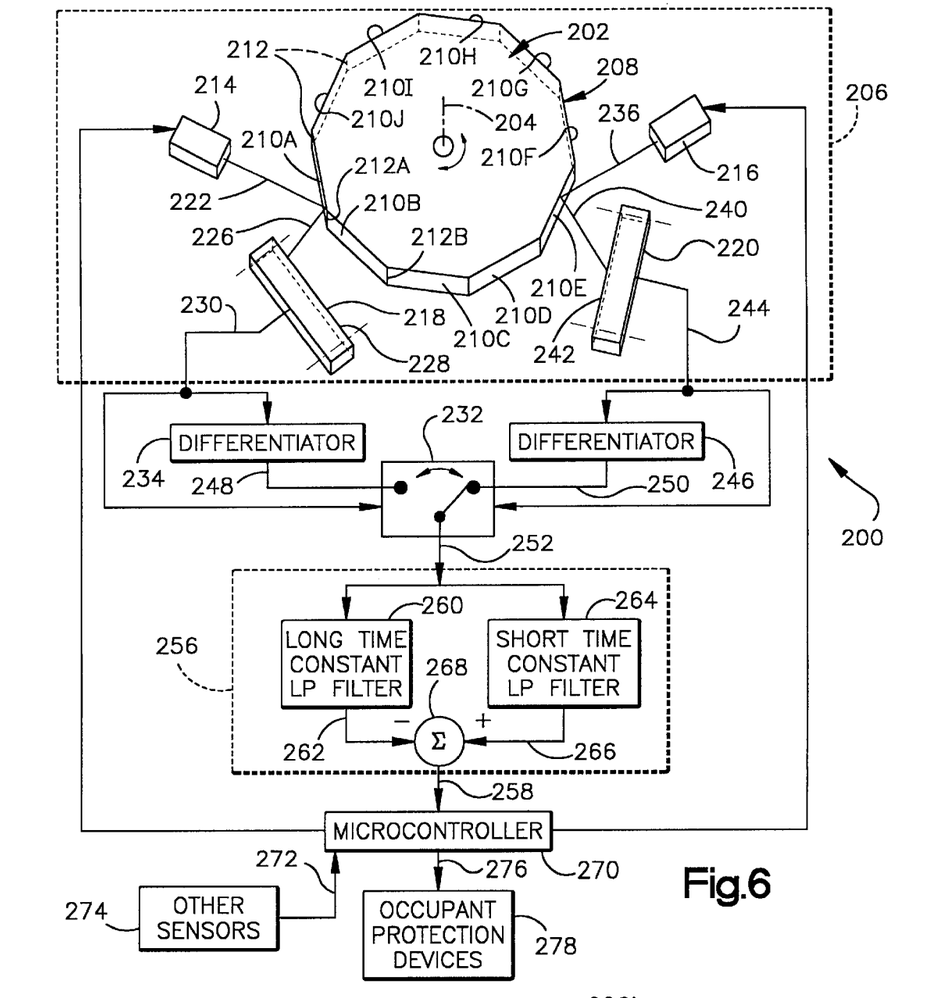
FIG. 6 is a schematic diagram of a vehicle rollover sensor apparatus in accordance with a fourth example embodiment of the present invention.

FIG. 6 is an illustration of a vehicle rollover sensing apparatus 200 that is another example embodiment in accordance with the present invention. The apparatus 200 includes a rotor 202 mounted for substantially free rotation about a rotor axis 204 relative to a housing 206. The rotor 202 has an outer periphery that has an outer sidewall portion 208 having a plurality of reflective facets 210A–210J, such as shown and described with respect to FIG. 1. The juncture between each adjacent pair of facets (e.g., 210A, 210J) defines a vertex (e.g., 212A).

The apparatus 200 also includes first and second light sources 214, 216 and associated first and second light detectors 218, 220. The first light source 214 (e.g., an LED) provides a substantially collimated light beam 222 onto an adjacent facet (e.g., 210A) of the rotor 202. The adjacent facet (e.g., 210A) reflects a reflected beam 226 toward the associated first light detector 218.

In this example embodiment, the first light detector 218 is a PSD having a light receiving surface 228 formed of, for example, a plurality of photodiodes responsive to the reflected light beam 226. Hereinafter, the first light detector 218 in referred to as a first PSD 218. The PSD 218 provides a detector signal 230 indicative of the position at which the reflected light beam 226 strikes the light receiving surface 228. The detector signal 230 is provided to a control input of a switching module 232 and to a differentiator circuit 234.

The second light source/detector pair 216, 220 is substantially identical to the first pair. Briefly stated, the second light source 216 (e.g., an LED) emits a substantially collimated light beam 236 onto an adjacent facet (e.g., 210E) of the rotor 202. The second light detector 220, which is a second PSD, receives a reflected light beam 240 at its light receiving surface 242. Hereinafter, the second light detector 220 is referred to as the second PSD 220.

The second PSD 220 provides a detector signal 244 indicative of the position at which the reflected light beam 240 strikes its light receiving surface 242. The detector signal 244 from the second PSD 220 is provided to another differentiator circuit 246 and to a second control input of the switching module 232.

Each PSD detector signal 230, 244 has a value that represents the position at which the reflected light beam strikes the light receiving surface 228, 242 of the respective PSD 218, 220. The value of each detector signal 230, 244 thus changes an amount proportional to the relative rotation between the rotor 202 and the housing 206 about the rotor axis 204. Each of the differentiator circuits 234, 246 differentiates the respective PSD detector signal 230, 244 with respect to time. Each differentiator circuit 234, 246 provides a differentiated signal 248, 250 having a characteristic indicative of a rate of change of the detector signal 230, 244 received from its associated PSD 218, 220.

Each differentiator circuit 234, 246 provides its differentiated signal 248, 250 to the switching module 232. Each differentiated signal 248, 250 has a characteristic indicative of the rate of relative rotation between the rotor 202 and the housing 206. The switching module 232 passes one of the differentiated signals 248 or 250 as an output signal 252 to a filter network 256. The particular differentiated signal 248 or 250 that is provided to the filter network 256 is based on the detector signals 230 and 244. The detector signals 230 and 244 operate as control signals for the switching module 232. The switching module 232 is configured, such as through appropriate control logic, to provide the output signal 252 according to a selected PSD 218 or 220. In particular, the switched output signal 252 corresponds to the differentiated signal 248 or 250 associated with a respective PSD 218 or 220 that is receiving the reflected light beam in the active region of its light receiving surface 228 or 242, respectively. In this way, the switching module 232 operates to electrically connect the output of a selected one of the differentiator circuits 234, 246 to the filter network 256 in response to the detector signals 230 and 244.

Assume that, for purposes of explanation, that the output signal 252 of the switching module 232 corresponds to differentiated signal 248. As appropriate logic of the switching module 232 determines that the detector signal 230 has value indicating that the reflected light beam 226 is approaching an end portion of the first PSD 218, the switching module switches in the other differentiated signal 250 associated with the second PSD 220. At this time, the differentiated signal 248 associated with the first PSD 218 is switched out. Similarly, when the switching module 232 determines that reflected light beam 226 is once again within the active region of the first PSD 218, the switching module 232 switches back in the differentiated signal 248 and switches out the other differentiated signal 250. Alternative switching schemes could be used for toggling between the differentiated signals 248 and 250.

As mentioned above, the switched output signal 252 is provided to a filter network 256. The filter network 256 is configured to smooth the output signal 252 as well as to remove a time-averaged portion of the signal. The time-averaged part of the output signal 252 corresponds to initial relative rotation of the rotor 202 and/or relatively slow varying components of the output signal 252. The filter network 256 also operates to reduce fluctuations in the output signal 252 corresponding to the switching module 232 switching between differentiated signals 248 and 250. The stabilization of the output signal 252 helps compensate for bifurcation of the reflected light beams 226, 240. The filter network 256 provides an output signal 258 indicative of a substantially instantaneous rate of angular rotation of the rotor 202. When the apparatus 200 is mounted in a vehicle, the output signal 258 provides an indication of a vehicle rollover condition.

The filter network 256 is substantially identical to the filter network 138 previously described with respect to FIG. 1. The filter network 256 includes a long-time constant or averaging filter 260, such as a low pass filter having a long time constant (e.g., having a corner frequency of about 0.01 Hz). The filter 260 passes a time-averaged, low frequency component of the output signal 252 as a signal 262. The signal 262 has a characteristic indicative of a rate of relative rotation between the rotor 202 and the housing 206 that has been averaged over time. That is, the signal 262 represents an average angular velocity of the rotor 202 corresponding to initial rotation of the rotor.

The output signal 252 from the switching module 232 also is provided to another filter 264 connected in parallel with the filter 260. The filter 264 is, for example, a low pass filter having a substantially shorter time constant than the filter 260 (e.g., having a corner frequency of about 100 Hz). The filter 264 filters the output signal 252 to provide a signal 266, which includes a signal component indicative of a more rapidly varying and substantially instantaneous component of angular velocity than the other filtered signal 262. The signal 266 also includes the more static signal component indicative of initial rotation between the rotor 202 and the housing 206.

In this example embodiment, the filter network 256 includes a summer 268 that subtracts the signal 262 from the signal 266 to provide the output signal 258. As mentioned above, the output signal 258 has a characteristic indicative of the instantaneous rate of rotation (e.g., angular velocity) of the rotor 202. The differentiator circuits 234 and 246, the switching module 232, and/or the filter network 256, including the summer 268, could be implemented in hardware and/or software.

The output signal 258 is provided to a microcontroller 270. The microcontroller 270 also is connected to each of the light source 214, 216 for providing control signals that control the operating characteristics of each light source. The microcontroller 270 also receives one or more signals 272 from one or more other sensors 274, such as described above. The microcontroller 270 processes the output signal 258 and the signals 272 to determine whether a vehicle crash event exists, including the occurrence of a vehicle rollover condition. Specifically, the microcontroller 270 determines the occurrence of a vehicle rollover condition in response to the output signal 258 indicating an instantaneous rotation rate that exceeds a predetermined threshold value. The threshold value, which may be fixed or variable, is determined based on empirical testing for a particular vehicle platform. Upon determining the occurrence of a vehicle crash event, the microcontroller 270 provides an output control signal 276 to one or more associated occupant protection devices 278. The control signal 276 controls actuation of the occupant protection devices 278 for helping to prevent vehicle rollover from occurring and/or helping to protect a vehicle occupant during vehicle rollover.

FIGS. 7A–7D illustrate an example of how the reflected light beams 226 and 240 move relative to the respective PSDs 218 and 220 in the apparatus of FIG. 6. While for purposes of brevity, the PSDs 218 and 220 are illustrated as being adjacent to one another, they typically are situated at somewhat opposed sides of the rotor 202, such as shown in FIG. 6. In this example, the reflected light beams 226 and 240 move relative to the respective PSDs 218 and 220 in a direction indicated by arrow 280 in response to rotation of the rotor 202 (FIG. 6) in a corresponding direction.

Figures 7A, 7B:
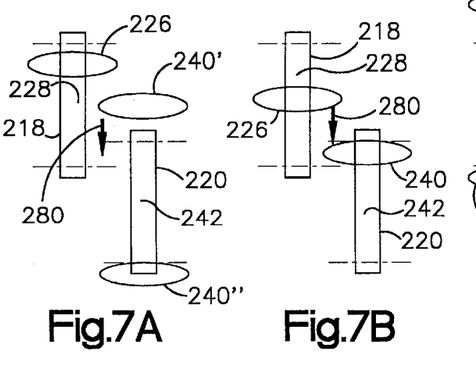
FIGS. 7a–7d are a series of view that illustrate movement of reflected light beams relative to associated light detectors in the apparatus of FIG. 6.

In FIG. 7A, the first light beam 222 strikes a central part of an adjacent facet (e.g., 210A) so that the reflected beam 226 illuminates the active region of the first PSD 218. In this situation, the second light beam 236 strikes a vertex (e.g., 212A) and is bifurcated into first and second reflected beam portions, indicated at 240' and 240". Under such circumstances, the differentiated signal for the first PSD 218 is switched in by the switching module 232 and provided to the filter network 256 (FIG. 6). In FIG. 7B, the rotor has rotated relative to each of the light sources and PSDs, such that no bifurcation condition exists for either light source. The switching module 232 will continue to provide a detector signal based on the light received at the first PSD 218, although the signal from either PSD 218 or 220 could be used.

Because the switching module 232 (FIG. 6) receives detector signals from each of the PSDs 218, 220, the switching module is able to determine an approaching bifurcation condition. The switching module 232, therefore, connects the differentiated signal 250 from the second PSD 220 to the filter network 256 upon determining an impending bifurcation condition associated with the currently switched-in PSD 218.

Figures 7C, 7D:
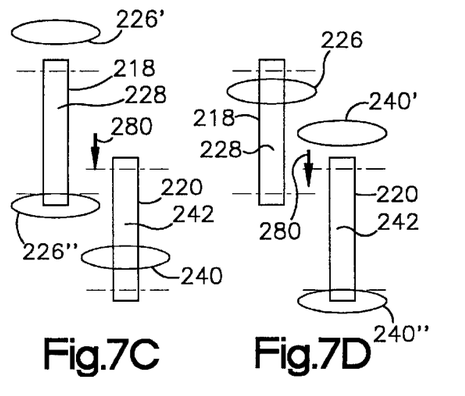

In FIG. 7C, the rotor 202 has rotated to a position relative to each of the light source 214, 216 such that the light beam 222 from the first light source strikes a vertex (e.g., 212A) and is bifurcated. This results in two reflected light beam portions indicated at 226' and 226". One of the reflected beams 226" strikes a lower portion of the first PSD 218 while the other beam portion 226' does not strike the PSD. The other reflected light beam 240 strikes the associated PSD 220 within the active region of its light receiving surface 242. The switching module 232 thus provides the differentiated signal 250 to the filter network 256.

As the rotor 202 (FIG. 6) continues to rotate, the bifurcation condition associated with the first PSD 218 ends and the reflected light beam 226 from the first source strikes the light receiving surface 228 of the associated PSD 218 in its active region, as shown in FIG. 7D. The continued rotation of the rotor 202 also causes the other reflected light beam to bifurcate into portions 240' and 240". The switching module 232, therefore, switches back in the differentiated signal 248 from the first PSD 218 and switches out the signal from the second PSD 220. The combination of low pass filters 260 and 264 (FIG. 1) advantageously operates to substantially remove corresponding signal characteristics caused by the switching between differentiated signals 248 and 250 during bifurcation of the light beams.

Figure 8:
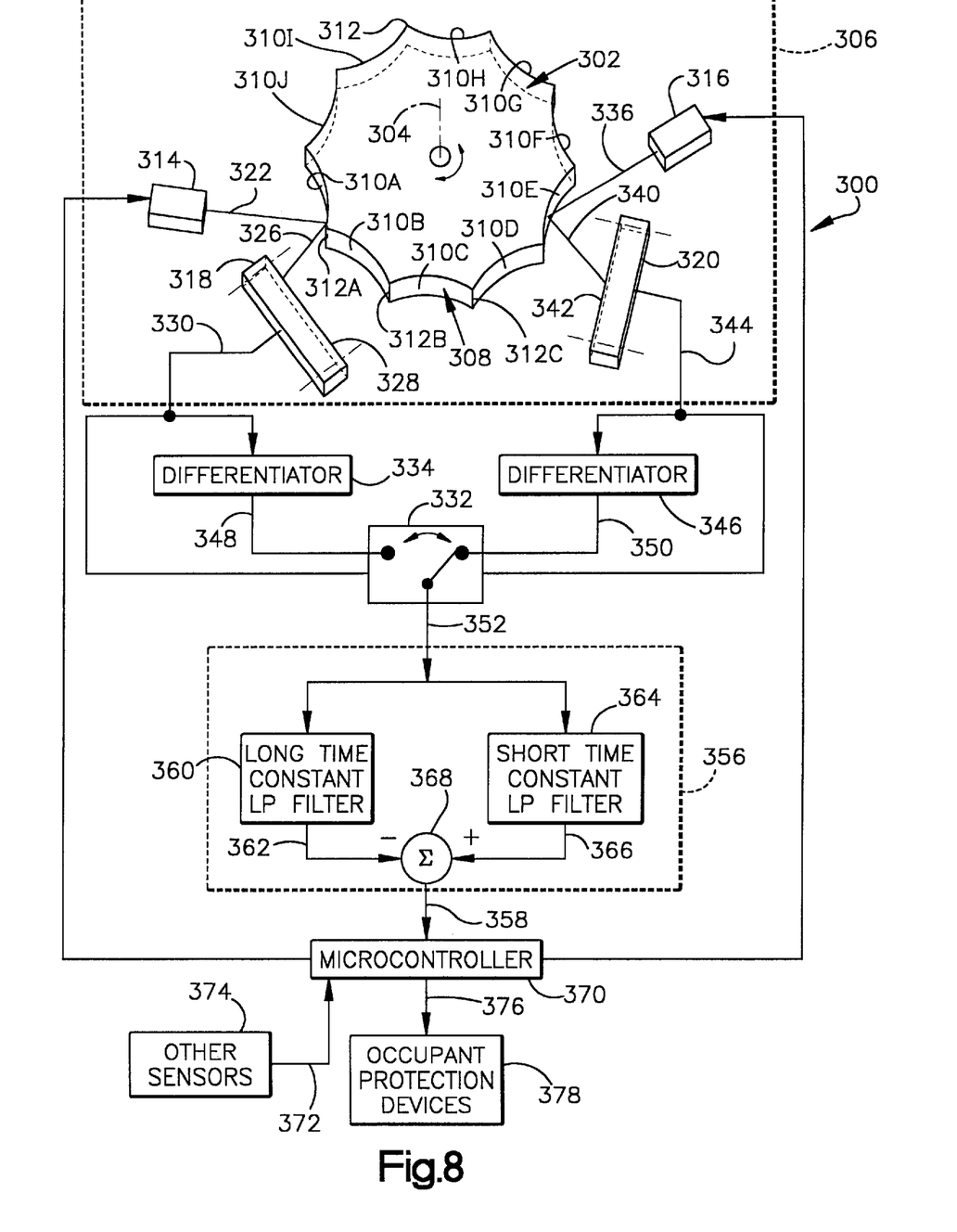
FIG. 8 is a schematic diagram of a vehicle rollover sensor apparatus in accordance with a fifth example embodiment of the present invention.

FIG. 8 is an illustration of a vehicle rollover sensing apparatus 300 that is another example embodiment in accordance with the present invention. Some of the structure of the apparatus 300 corresponds to structure previously identified with respect to the apparatus 200 of FIG. 6. For the apparatus 300 of FIG. 8, similar reference numbers (i.e., increased by a value of 100 from those used in FIG. 6) are used to refer to parts that have a correspondence with parts of the apparatus 200 of FIG. 6.

The rotor 302 (FIG. 8) is mounted for substantially free rotation about a rotor axis 304 relative to a housing schematically indicated at 306. The rotor 302 has an outer periphery that is a substantially cylindrical outer sidewall portion 308 having a plurality of reflective facets 310A–310J. In this example embodiment, each of the facets 310A–310J is curved. In the illustrated example, the facets 310A–320J are concave (i.e., bowed radially inward toward the axis 304). The juncture between each adjacent pair of facets (e.g., 310A and 310B) defines a generally pointed vertex (e.g., 312A). The concave facets 310A–310J enable a lesser sensitivity to rotation of the rotor relative to the light sources and PSDs. That is, a reflected light beam exhibits decreased movement for a given amount of rotor rotation allowing use of smaller and less expensive PSDs. Similarly, convex (i.e., bowed radially outward from the rotation axis) facets could be used to amplify the sensitivity. This enables a smaller overall construction of the sensor apparatus.

The remaining features of the apparatus 300 of FIG. 8 are substantially identical to that of FIG. 6. The apparatus 300 includes a first light source 314 (e.g., an LED) and associated light detector 318. The apparatus also includes a second light source 316 (e.g., an LED) and associated light detector 320. The first light source 314 provides a light beam 322 onto an adjacent facet (e.g., 310A) of the rotor 302, which reflects a reflected beam 326 toward the associated light detector 318. The second light source 316 provides a light beam 336 onto an adjacent facet (e.g., 310E) of the rotor 302, which reflects a reflected beam 340 toward the associated light detector 320.

In this example embodiment, each of the light detectors 318, 320 is a PSD having a respective light receiving surface 328, 342. The light receiving surfaces 328 and 342 are formed of, for example, a plurality of photodiodes responsive to the reflected light beam. Each PSD provides a detector signal 330, 344 indicative of the position at which the reflected light beam 326, 340 strikes the respective light receiving surface 328, 342.

The radius of curvature of the facets 310 determines the amount of movement of each reflected light beam 326, 340 during rotation of the rotor 302. A smaller radius of curvature will decrease (for smaller PSDs) the linear distance that each reflected light beam 326, 340 moves along the light receiving surface 328, 342 of the associated PSD 318, 320 for a given amount of rotation of the rotor 302.

The detector signals 330 and 344 are provided to corresponding control inputs of a switching module 332. Each detector signal 330, 344 also is provided to a respective differentiator circuits 334, 346. Each of the differentiator circuits 334, 346 differentiates its received detector signal with respect to time and provides a corresponding differentiated signal 348, 350. The differentiated signals 348 and 350 are proportional to the rate of relative rotation (e.g., angular velocity) between the rotor 302 and the housing 306.

Each differentiator circuit 334, 346 provides its differentiated signal 348, 350 to the switching module 332. As mentioned above, the switching module 332 passes a selected one of the differentiated signals 348 or 350 as a switched output signal 352 based on the detector signals 330 and 344 from the PSDs 318 and 320, respectively.

The output signal 352 is provided to a filter network 356. The filter network 356 includes a long-time constant or averaging filter, such as a low pass filter 360 having a long time constant. The filter 360 passes a time-averaged, low frequency component of the output signal 352 and provides a signal 362. The signal 362 has a characteristic indicative of a time-averaged rate of relative rotation between the rotor 302 and the housing 306.

The filter network 356 also includes another filter 364 connected in parallel with the filter 360. The filter 364 is a low pass filter having a substantially shorter time constant than the other filter 360. The filter 364 filters the output signal 352 to provide a signal 366 indicative of a more rapidly varying and substantially instantaneous rate of relative rotation than the signal 362. The signal 366 includes a component indicative of initial rotation.

A summer 368 subtracts the time-averaged filtered signal 362 from the more rapidly varying filtered signal 366 to provide the filter output signal 358. The filter output signal 358 has a characteristic indicative of the instantaneous rate of rotation of the rotor 302. As mentioned above, the filter network 356 adds stability to the switched output signal 352, which helps compensate for bifurcation of the light beams.

The filter network 356 is connected to a microcontroller 370 for providing the output signal 358. The microcontroller 370 also is connected to one or more other sensors 374 and to one or more occupant protection devices 378. The microcontroller 370 receives the signals 358 and 372 and processes the signals to determine whether a vehicle crash event exists. Specifically, the microcontroller 370 determines whether a vehicle rollover condition exists based on the output signal 358 indicating an instantaneous rotation rate that exceeds a predetermined threshold value. Upon determining the occurrence of a vehicle crash event, the microcontroller 370 outputs a control signal 376 to control actuation of the associated occupant protection devices 378.

In each of the example embodiments described above, a rollover condition is detected based upon a variable relative rotation rate between the rotor and housing, which is independent of rotor position. Thus, no rest position of the rotor needs to be determined. This is because the rotor is inertially balanced for substantially free rotation about the rotor axis and the effects of initial relative rotation of the rotor are removed by appropriate filtering. Accordingly, the apparatus enables efficient detection of a vehicle rollover condition.

While the example embodiments are herein described with optical based rotation sensors (i.e., including a light emitter and associated detector in combination with a light-reflecting, faceted rotor), it is contemplated that other types of sensor constructions may be utilized to sense relative rotation of the rotor, in accordance with the present invention. Such other sensor constructions may be optical based or non-optical based constructions. Examples of non-optical based constructions that may be used in accordance with the present invention include electromagnetic, and/or acoustic constructions. Such alternative constructions would be associated with the rotor in a manner similar to the optical sensor constructions described above.

Such alternative sensors would each provide a signal that varies as a function of the relative rotation of the rotor. Such a signal is differentiated and filtered, such as described above, to remove a parameters from the detector signal that are due to initial rates of relative rotation of the rotor and fluctuations caused by interruptions (e.g., bifurcation) in the detected signal. The filter provides a signal, e.g., a rollover signal, indicative of a substantially instantaneous relative rate of rotation between the rotor and the housing. A suitable controller, which is responsive to the rollover signal, determines the occurrence of a vehicle rollover condition based on the rollover signal provided by the filter. The controller also may control actuation of associated occupant protection devices.

Also, a damper for the rotor itself to can be used to facilitate the decay of long term rotations imparted by vibration or friction with the housing during actual rotation of the housing with respect to the rotor such as might be expected in cornering or on rough roads. Such a damper could be magnetic (magnet in housing or on rotor with the opposing rotor or housing having conductive surfaces), brushes or materials such as air in the rotor housing to provide drag. The damping would necessarily be small enough so as to effect only long term rotations (minutes or more) and have minimal effect on the time scale of a rollover, i.e., seconds.

Interposing a damping plate between the housing and the part of the vehicle to which it is mounted may reduce vibration of the housing relative to the vehicle in which it is mounted. The damping plate, for example, is formed of a soft, flexible material, such as rubber or plastic.

Further, the facets could be of unequal length and/or variable degrees of concavity or convexness. This would make possible a means of identifying which part of the rotor is being scanned and or could provide a controlled variation in the signal such as a pulsing.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for sensing angular rotation comprising:
    a mounting member;
    a rotor rotatably mounted to the member and rotatable about an axis, said rotor having an outer periphery with a plurality of reflective facets, a juncture between each adjacent pair of facets defining an associated vertex, the plurality of reflective facets forming vertices;
    a light source fixed relative to the member for emitting a light beam onto said rotor, the light beam from said light source being reflected by said facets and, during relative rotation between said rotor and the member, the reflected light beam being occasionally bifurcated by said vertices;
    a light detector fixed relative to the member for detecting the reflected light beam and providing a detector signal indicative of relative angular rotation between said rotor and the member and bifurcation of the emitted light beam; and
    compensation circuitry including filter means responsive to the detector signal for compensating for the bifurcation of the emitted light beam and for providing a signal indicative of the instantaneous relative rate of angular rotation between said rotor and the member.

2. An apparatus as set forth in claim 1, further including a controller for comparing the instantaneous relative rate of angular rotation against a threshold and providing a rollover signal indicative thereof.

3. An apparatus as set forth in claim 2, wherein said light detector includes a first light detector fixed relative to the member, and a second light detector fixed relative to the member, and outputs from both light detectors being used to provide the signal indicative of the instantaneous relative rate of angular rotation.

4. An apparatus as set forth in claim 3 further including a photodiode positioned to detect bifurcation and to provide a signal upon detection of bifurcation.

5. An apparatus as set forth in claim 4, wherein the signal from said photodiode controls operation of said first and said second light detectors.

6. An apparatus as set forth in claim 2, wherein said apparatus is operatively connected to an actuatable occupant protection device of a vehicle for, when actuated, helping to protect a vehicle occupant, and said controller controls actuation of the occupant protection device based on the rollover signal.

7. An apparatus as set forth in claim 1, wherein said light source includes a first light source for providing a first light beam and a second light source for providing a second light beam, and wherein said light detector includes a first light detector that detects reflection of the first light beam and provides a first detector signal and a second light detector that detects light from said second light source that is reflected by said facets, said second light detector provides a second detector signal, said first detector signal and said second detector signal both being indicative of the angular rotation of said rotor relative to the member.

8. An apparatus as set forth in claim 7, wherein said compensation circuitry further includes signal processing means for processing said first and second detector signals to substantially remove signal characteristics that correspond to bifurcation of the first light beam and providing the compensated output signal indicative of angular rotation of said rotor.

9. An apparatus as set forth in claim 8, wherein said signal processing means includes a filter that filters at least one of the first and second detector signals and provides a filter signal indicative of a time-averaged component of the one of the first and second detector signals, and said filter signal is subtracted from at least a part of the one of the first and second detector signals to provide the compensated output signal, in which signal characteristics that correspond to bifurcation of the first light beam have been substantially removed.

10. An apparatus as set forth in claim 1, wherein said filter means includes a filter operatively connected to said light detector and configured to provide a filter signal indicative of a time-averaged, low frequency component of the detector signal, and the filter signal is subtracted from at least part of the detector signal to provide the signal indicative of the instantaneous relative rate of angular rotation in which signal characteristics that correspond to bifurcation of the light beam are substantially removed.

11. An apparatus as set forth in claim 10, wherein said light detector has a light receiving surface that has a length and is positioned relative to said rotor and said light source so as to receive only one part of the reflected light beam during the bifurcation of the light beam, and said filter substantially removes signal characteristics that correspond to bifurcation of the light beam.

12. An apparatus as set forth in claim 1, wherein each of the plurality of reflective facets is curved.

13. An apparatus as set forth in claim 1, wherein each of the plurality of reflective facets is concave.

14. An apparatus as set forth in claim 1, wherein said rotor is inertially balanced such that said rotor remains stationary relative to an earth reference frame while said light source and said light detector move during angular rotation.

15. An apparatus as set forth in claim 1, wherein said facets are all identical.

16. A rollover sensor for a vehicle comprising:
a rotor rotatable about an axis and having an outer periphery with a plurality of reflective facets, each juncture between each adjacent pair of facets defining a vertex;
a light source that emits a light beam onto said rotor, the light beam from said light source being reflected by said facets and occasionally bifurcated by said vertices;
a light detector that detects the reflected light and that provides a detector signal indicative of angular rotation of said rotor and the bifurcation;
compensation circuitry responsive to the detector signal that compensates for the bifurcation and provides a compensated output signal indicative of angular rotation of said rotor; and
a controller that determines an angular velocity of the vehicle based on the compensated output signal, said controller determining a vehicle rollover condition based on the determined angular velocity of the vehicle and wherein said compensation circuitry includes a differentiator to differentiate the detector signal and a filter that filters the differentiated detector signal and provides a first signal indicative of a time-averaged component of the differentiated detector signal, which is indicative of angular velocity of said rotor, and the first signal is subtracted from at least part of the differentiated detector signal to define the compensated output signal.

17. A sensor as set forth in claim 16, wherein said compensation circuitry further includes a second filter that has a second time constant which is less than the first time constant, said second filter filters the detector signal and provides a second signal indicative of angular velocity of said rotor, and said first signal is subtracted from the second signal to provide the compensated output signal.

18. A method for sensing angular rotation of an object, said method comprising the steps of:
mounting a rotor for rotation relative to the object responsive to movement of the object, the rotor having an outer periphery with a plurality of reflective members, a juncture between each adjacent pair of the reflective members defining an associated vertex, the plurality of reflective members forming vertices;
emitting a beam onto said rotor, the emitted beam being reflected by the reflective members and during relative rotation between the rotor and the object, the reflected beam being occasionally bifurcated by the vertices;
detecting the reflected light and providing a detector signal indicative of relative angular rotation between the rotor and the object and bifurcation of the beam; and
filtering the detector signal for compensating for the bifurcation and providing a compensated output signal indicative of the instantaneous relative rate of angular rotation between the rotor and the object.

19. A method as set forth in claim 18, wherein the object is a vehicle and said method further includes the steps of determining angular velocity of the vehicle based on at least one of the compensated output signal and the detector signal and determining the occurrence of a vehicle rollover condition based on the determined angular velocity of the vehicle.

20. A method as set forth in claim 19 further including the step of controlling actuation of an occupant protection device based on the determined angular velocity for helping to protect an occupant of the vehicle.

21. The method of claim 18 wherein the step of filtering the detector signal includes providing a time average component of the detector signal.

22. The method of claim 21 further including the step of subtracting the filtered detector signal from the detector signal and providing a resultant signal indicative of the instantaneous relative rate of angular rotation of the rotor relative to the object.

* * * * *